US005107258A

United States Patent [19]

Soum

[11] Patent Number: 5,107,258

[45] Date of Patent: Apr. 21, 1992

[54] WIRELESS REMOTE CONTROL HIGH SECURITY SYSTEM PERMITTING THE OPENING OR THEFT-PROOF CLOSING OF RELAYS ACTUATING SYSTEMS SUCH AS LOCKS

[76] Inventor: Rene Soum, 33 Rue Montcabrier, 31500 Toulouse, France

[21] Appl. No.: 251,577

[22] Filed: Sep. 30, 1988

Related U.S. Application Data

[63] Continuation-in-part of Ser. No. 39,166, Apr. 17, 1987, abandoned.

[30] Foreign Application Priority Data

Apr. 22, 1986 [FR] France ................................ 86 06217

[51] Int. Cl.[5] ........................ F05B 49/00; G06K 5/00; H01H 47/00; G06F 7/04

[52] U.S. Cl. ........................... 340/825.31; 340/825.34; 361/172; 70/278; 235/382

[58] Field of Search ........... 340/825.3, 825.31, 825.34, 340/825.69, 825.72, 825.22; 307/10.2; 361/172; 70/277, 278; 235/382, 382.5

[56] References Cited

U.S. PATENT DOCUMENTS

| | | | |
|---|---|---|---|
| 4,310,720 | 1/1982 | Check, Jr. | 340/825.31 |
| 4,385,231 | 5/1983 | Mizutani et al. | 235/382 |
| 4,471,216 | 9/1984 | Herve | 235/380 |
| 4,509,093 | 4/1985 | Stellberger | 361/172 |
| 4,535,333 | 8/1985 | Twardowski | 340/825.69 |
| 4,573,046 | 2/1986 | Pinnow | 340/825.31 |
| 4,596,985 | 6/1986 | Bongard et al. | 340/825.72 |
| 4,665,397 | 5/1987 | Pinnow | 340/825.72 |
| 4,686,529 | 8/1987 | Kleefeldt | 340/825.69 |
| 4,723,121 | 2/1988 | van den Boom et al. | 340/825.31 |
| 4,755,815 | 7/1988 | Savoyet et al. | 361/142 |
| 4,812,841 | 3/1989 | Chen | 70/278 |

FOREIGN PATENT DOCUMENTS

| | | | |
|---|---|---|---|
| 1169948 | 6/1984 | Canada | 70/278 |
| 1210818 | 9/1986 | Canada . | |
| 0244332 | 11/1987 | European Pat. Off. | 70/278 |
| 8503785 | 8/1985 | PCT Int'l Appl. | 340/825.31 |

*Primary Examiner*—Donald J. Yusko
*Assistant Examiner*—Brian Zimmerman
*Attorney, Agent, or Firm*—Young & Thompson

[57] ABSTRACT

A wireless remote control high security system permits the opening or theft-proof closing of relay actuating systems such as locks. The system comprises an assembly of remote control security keys and locks in which the key has the sole function of emission and the lock the sole function of reception in connection with the function of absolute security of opening or closing locks.

6 Claims, 4 Drawing Sheets

WIRELESS REMOTE CONTROL HIGH SECURITY SYSTEM PERMITTING THE OPENING OR THEFT-PROOF CLOSING OF RELAYS ACTUATING SYSTEMS SUCH AS LOCKS

This application is a continuation-in-part of my copending application Ser. No. 07/039,166 filed Apr. 17, 1987, now abandoned.

BACKGROUND OF THE INVENTION

The present invention relates to a high security electronic remote control system for actuating relays and the like, comprising at least one key emitter and at least one lock receiver.

Known remote control systems permit actuation of a lock by the identification of a code transmitted by a key toward the lock. These systems have the major disadvantage that codes emitted by the key may be intercepted and reproduced and are therefore of questionable security.

BRIEF DESCRIPTION OF THE PRIOR ART

In U.S. Pat. No. 4,535,333 to TWARDOWSKI, there is disclosed a system comprising a key which always emits the same code to actuate a lock, and a lock in which the code is recorded. This system includes a receiver and a transmitter in each key and lock to ensure a dialogue between the two. The code emitted by the key to actuate the lock can be changed by manual intervention of the user. For intervention, the new code is recorded in the lock and transmitted by the lock to the key. This system provides a low degree of security owing to the possibilities of interception, reproduction, and utilization of the new code between the time of emission of the code by the lock to the key and the time of utilization of the key.

U.S. Pat. No. 4,596,985 to BONGARD et al. discloses a system which comprises a transmitter that can be set to emit any one of a succession of differently coded signals, a receiver that can be set to respond only to any one of a succession of signals, and a lock operable by the receiver. After each individual emission by the transmitter and reception by the receiver, these signals are automatically reset to the next of the signals in the succession. This system includes means capable to prevent some miscarriages between transmitter and receiver, but does not avoid the necessity of a reset if the number of the miscarriages is too large, and thus this system is obliged to emit again by the key and to accept by the lock the same emitted code owing to required resets in case of miscarriages. This re-emission of a code makes the system insecure.

The system disclosed in U.S. Pat. No. 4,723,121 proposes a synchronization between the keys and the locks by means of synchronized clocks in the key and in the lock. But this system cannot prevent lagging of the respective clocks if the key is not used for a long time, and does not eliminate the necessity of a reset, which is a part of applicant's invention.

SUMMARY OF THE INVENTION

The system according to the present invention emits solely from the key and receives solely at the lock with permanent and automatic synchronization between keys and locks and prohibits the use of intercepted messages since any message that has served once to actuate a lock cannot be used again to actuate this lock.

In accordance with the invention, the key emits upon actuation at least the number of the key, the number of the lock to be actuated, and the value of an internal counter with one-way incrementation and a random combination generated by means of any algorithm, from data of the lock and of the key and of the value of the interval counters. This combination could be referred to as a code.

According to another object of the invention, the lock receives from the key all of the information necessary to permit the lock to generate and thus to verify the combination emitted by the key. The synchronization between the variable combination emitted by the key and generated by the lock is automatic, whatever the number of the miscarriages of the emissions may be. The combination generated by the lock is obtained by the same algorithm as that of the key.

In order to eliminate any used emission intercepted and reproduced, the lock has a memory in which is recorded the number of the key or keys authorized to actuate it and the previous value of each internal counter of the key or keys at the time of the previous actuation of the lock by the key and a connection to increment the previous value corresponding to the key actuating the lock to the level of that of the key's internal counter emitted at the time of the last effective actuation of the lock by this key.

The invention performs a perfect synchronization between keys and locks with variable codes sent to each emission by the key, whatever the number of the miscarriage of these emissions, because the lock receives from the key all of the information permitting this lock to verify or generate all of the message, combination included, sent by the key. This eliminates any previous used emission, thereby ensuring a total security.

BRIEF DESCRIPTION OF THE FIGURES

Other objects and advantages of the subject invention will become apparent from a study of the following specification when viewed in the light of the accompanying drawing, in which.

DETAILED DESCRIPTION

The simplest way to design keys and locks is by inscribing a program in a unique component comprising both non-volatile memories and a CPU. The key comprises a keyboard, a battery, the unique component, and an emitter. The lock comprises a keyboard, a battery, the unique component, and a receiver. This kind of component is commercially available.

The electronic remote control system according to the invention comprises a set of authorized keys and locks to be actuated.

Figure 1:
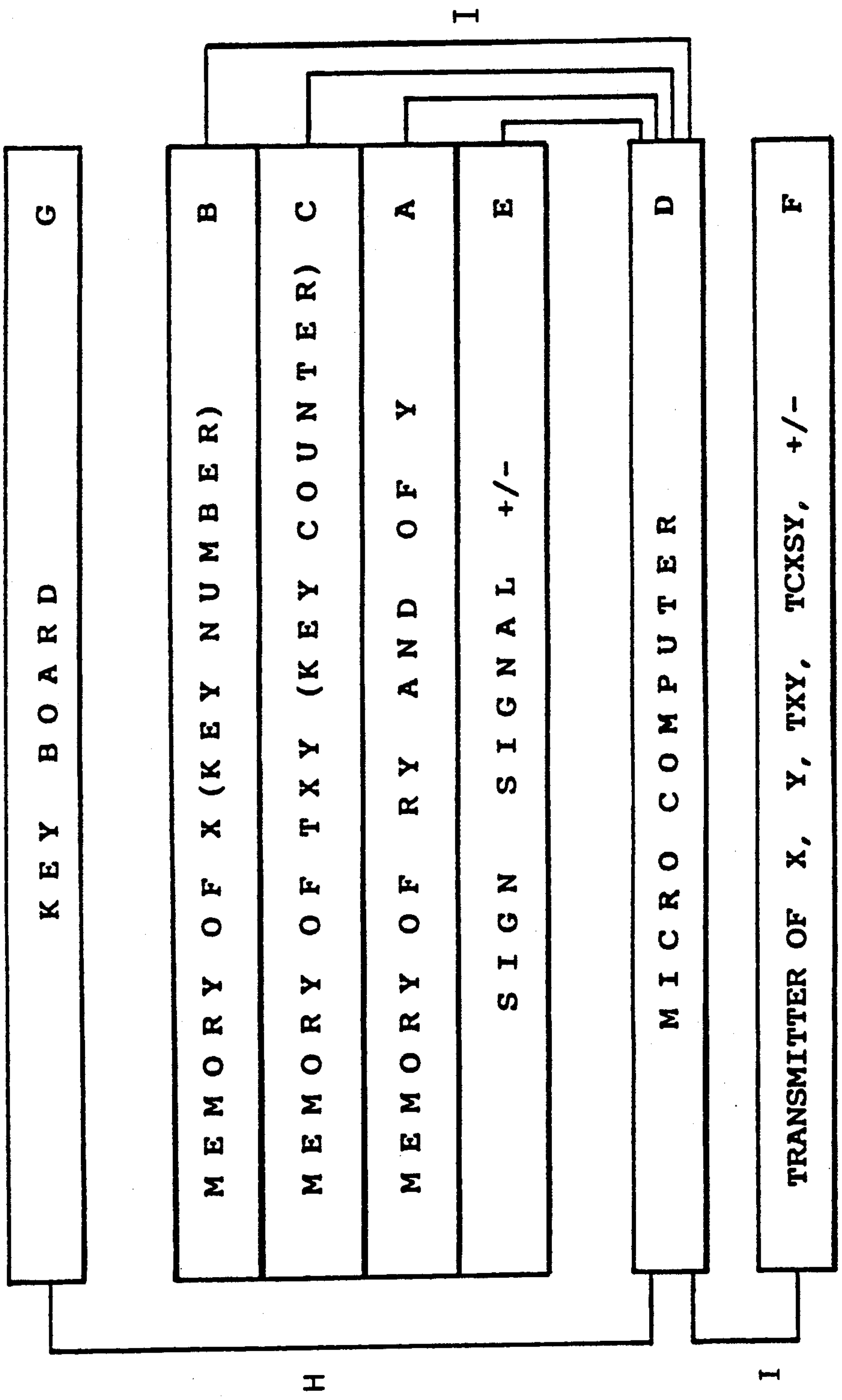
FIG. 1 is a block diagram illustrating an example of the electronic components of a key according to the invention.

Referring now to FIG. 1, each key includes a keyboard (G) for introducing data in non-volatile memories (A) and (E) and for designating the desired lock to be actuated. A memory (B) in which the key's number (X) under consideration is registered by construction is connected with the keyboard via a computer D. The numbers of different keys are different, that is to say, each number corresponds to only one key. An internal electronic counter (C) comprising a memory is also connected with the keyboard via the computer D. The value of the counter is incremented by the computer (D) in a one-way manner upon each action on the key. The designated incremented value (T X Y) is registered in the memory (C) of the internal counter. A further memory (A) contains a correspondence table of constructor's numbers (Y) of the locks and lock references (RY) chosen by the user. The pairs of lock numbers (Y) and lock references (RY), relative to each lock to be actuated are introduced into the memory (A) of the key able to actuate the lock, by the user via the keyboard (G).

The computer (D) increments the counter (C) in a one-way manner by a value (Z) upon each actuation of the key. The value of the counter (C) is named (TXY) after the incrementation. The computer also enciphers, by a secret algorithm, the number (Y) of the lock desired to be actuated, with the key's number (X) and the incremented value (TXY) of the counter (C). The combination obtained is designated (TCXSY). The computer is connected by a line (H) to the keyboard (G) and by a line (I) to the memories (A), (B) and (C).

The memory (E) of the key includes through construction of the key two type order signals (+) and (−). Each of these signals is identifiable by the lock, signifying to the lock the type of order received; namely, opening or closing. The memory (E) is connected by line (I) to the computer (D). The user selects one of these signals through the keyboard (G).

An emitter (F), such as a radio transmitter is connected by line (I) to the computer (D), transmitting to the lock which is desired to be actuated, the signals representative of the number (X) of the key, the number (Y) of the lock, the incremented value (TXY) of the counter (C), the enciphered value (TCXSY), and the chosen signal (+) or (−). All of the memories (B), (C), (A) and (E) can be obtained by the same non-volatile memory component.

Figure 2:
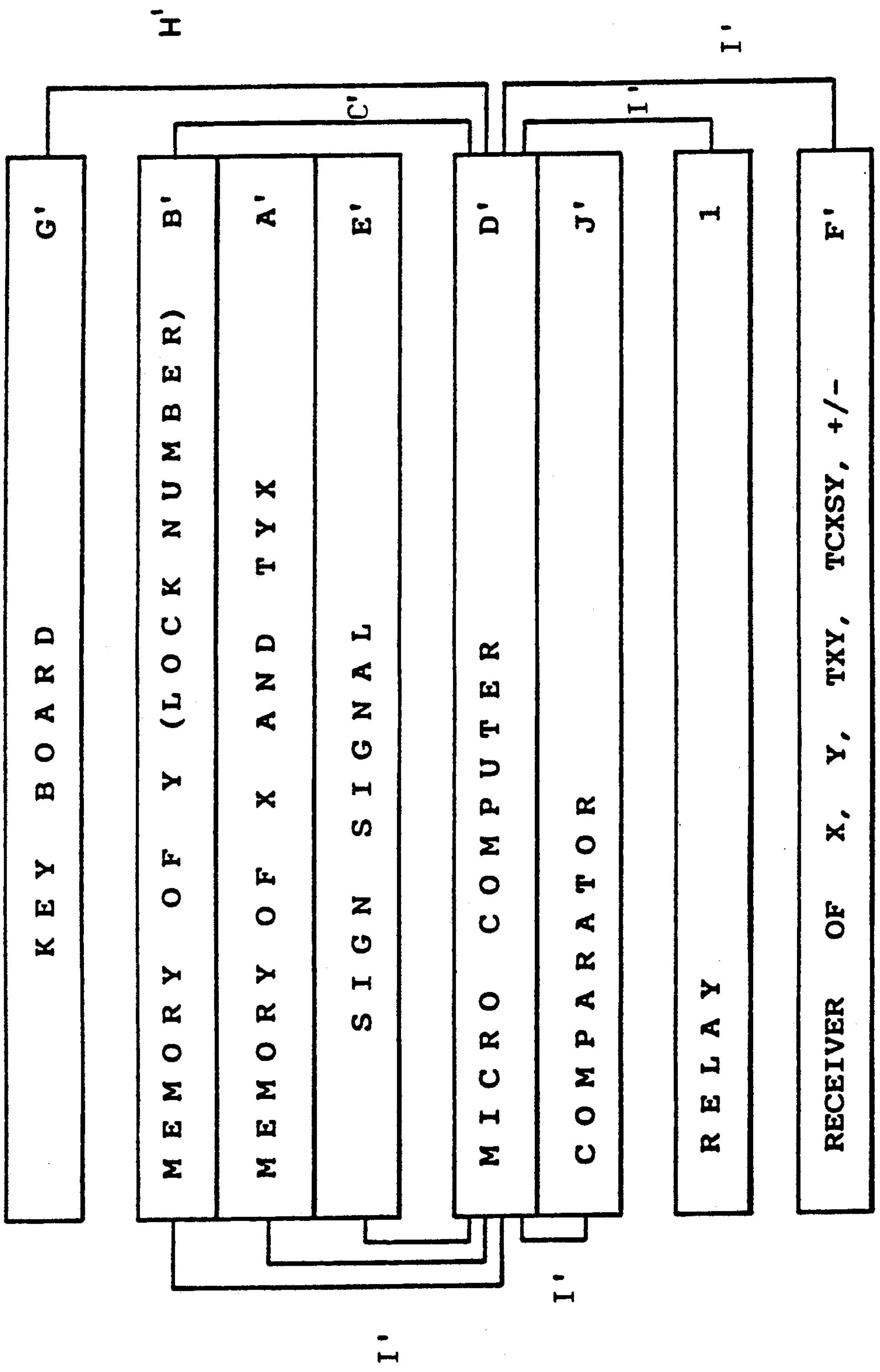
FIG. 2 is a block diagram illustrating an example of the electronic components of a lock according to the invention.

Referring now to FIG. 2, each lock of the electronic key-lock remote control system of the invention includes a keyboard (G′) for introducing data into a memory (A′). A memory (B′) in which the lock's number (Y) is registered by construction is connected with the keyboard via a computer D. The numbers of different locks are different, so that each number corresponds to only one lock. A memory (A′) is provided in which the numbers of the authorized key are introduced by the user via the keyboard (G′), the numbers being registered in the memory (A′) and in which the last received values (TXY) from the different authorized keys are registered and designated (TYX), each of these values corresponding to one of the authorized keys (X) and registered as it is in memory (A′).

A receptor (F′) receives from the key's emitter (F) the signals representative of the key's number (X), the lock's number (Y), the incremented value (TXY) of the key counter, the enciphered value (TCXSY), and the chosen signal (+) or (−).

A computer (D′) increments the previous value (TYX) to the received incremented value (TXY) via the connection (C′) only if the received incremented value (TXY) is greater than the last previous value (TYX) corresponding to the same key. The computer (D′) also determines by the same secret algorithm as that of the keys, and on the basis of the received key's number (X), the number (Y) of the lock under consideration, and the received incremented value (TXY) of the internal counter (C) of the key (X), an enciphered value designated (TSYCX). The memories (A′) and (B′) and the receptor (F′) are connected to the computer (D′) by the connections (I′) and the computer (D′) is connected with the keyboard (G′) by the connection (H′).

A connection (C′) is provided for incrementing, under the control of the computer (D′), the last value (TYX) corresponding to the same key and registered in the memory (A′) to the received incremented value (TXY) which will be designated again (TYX). This connection (C′) is an analogical representation of the action of the computer (D′) which increments by software the previous value (TYX) to the value (TXY).

A memory (E′) is connected with the computer (D′) by a connection (I′) and includes, by manufacture of the lock, two signals (+) and (−) signifying, respectively, opening or closing.

A comparator (J′) verifies that the received lock's number (Y) corresponds to the lock's number under consideration and registered in memory (B′), that the received key's number (X) corresponds to one of those memorized in (A′), that the received incremented value (TXY) is at a higher level than the last received value from the same key and memorized in memory (A′) as (TYX), that the enciphered value (TCXSY) by the computer (D′) is the same as that (TCXSY) received from the key and accordingly, if these conditions are satisfied, orders for opening (+) or for closing (−) of the lock. This order is transmitted to a relay (1) by the computer (D′) via a connection (I′). All of the memories (B′), (A′) and (E′) can be obtained by the same non-volatile memory component and the comparator (J′) can be done by software for the microcomputer (D′) via the connection (I′).

The operation of the system, comprising several keys and several locks, is set forth hereinafter. It is to be noted that the system may comprise a single key and several locks or several keys and a single lock or a single key and a single lock.

The user introduces in the memory (A′) of each lock the number or numbers (X) of the key or keys authorized to actuate the lock in question, with the aid of a keyboard (G′). In the same manner, he introduces into the memory (A) of each key the reference or references (RY) and also the corresponding number or numbers (Y) of the lock or locks to be actuated by the key, with the aid of the keyboard (G).

Specifically, each lock has a number (Y) ordained at manufacture, this latter always being very long (i.e. composed of several characters). So as not to compose at each usage the number of the lock to be actuated, a correspondence table (RY)-(Y) is created in the memory (A) of the lock. The user may thus choose a simple reference (RY) (composed of one or two characters) corresponding to each number (Y) of the lock.

To actuate a lock (Y), the user introduces the reference (RY) corresponding to the lock and also the signal (+) or (−) corresponding to the order to open or to close.

The counter (C) is incremented with each action on the key by the value (Z), the new value is named (TXY) and the computer (D) combines via an algorithm the number (Y) of the lock to be actuated, the number (X) of the key in question and the value (TXY) of the counter (C), the combination obtained being named (TCXSY).

The transmitter (F) transmits to the lock the number (X), the number (Y), the value (TXY), the combination (TCXSY) and also the opening order (+) or closing order (−). The receiver (F') of the lock receives the information sent by the transmitter. A comparator (J') verifies:

(1) if the number (X) received exists in the memory (A') of the lock;

(2) if the number (Y) received is the same as that of the lock memorized, by manufacture, in memory (B'); and (3) if the value (TXY) is greater than that received the last time by the same key and recorded in the memory (A') as (TYX). It is evident that for the first use of a key, the comparison is made with respect to 0 (with the value recorded in memory (A') being 0).

Once these conditions are satisfied the computer (D') combines, using the same algorithm as that of the key, the numbers (X) and (Y) with the value received (TXY), and the combination obtained is designated (TSYCX). The comparator (J') verifies that the combination (TCXSY) is equal to (TSYCX). Once that condition is satisfied, the opening or closing order is executed by acting on relay (1) (FIG. 2). The value (TXY) received by the lock is memorized in (A') and designated (TYX).

An example of the construction with electronic components is shown in FIG. 1 for the key, and in FIG. 2 for the lock. B and E, B' and E' are permanent memories. Memories C, A and A' are non-volatile memories whose contents may be modified. Computers D and D' comprise comparing and enciphering programs, inscribed by etching in silicon. Present techniques permit the incorporation of all of these functions into a single component.

Figure 3:
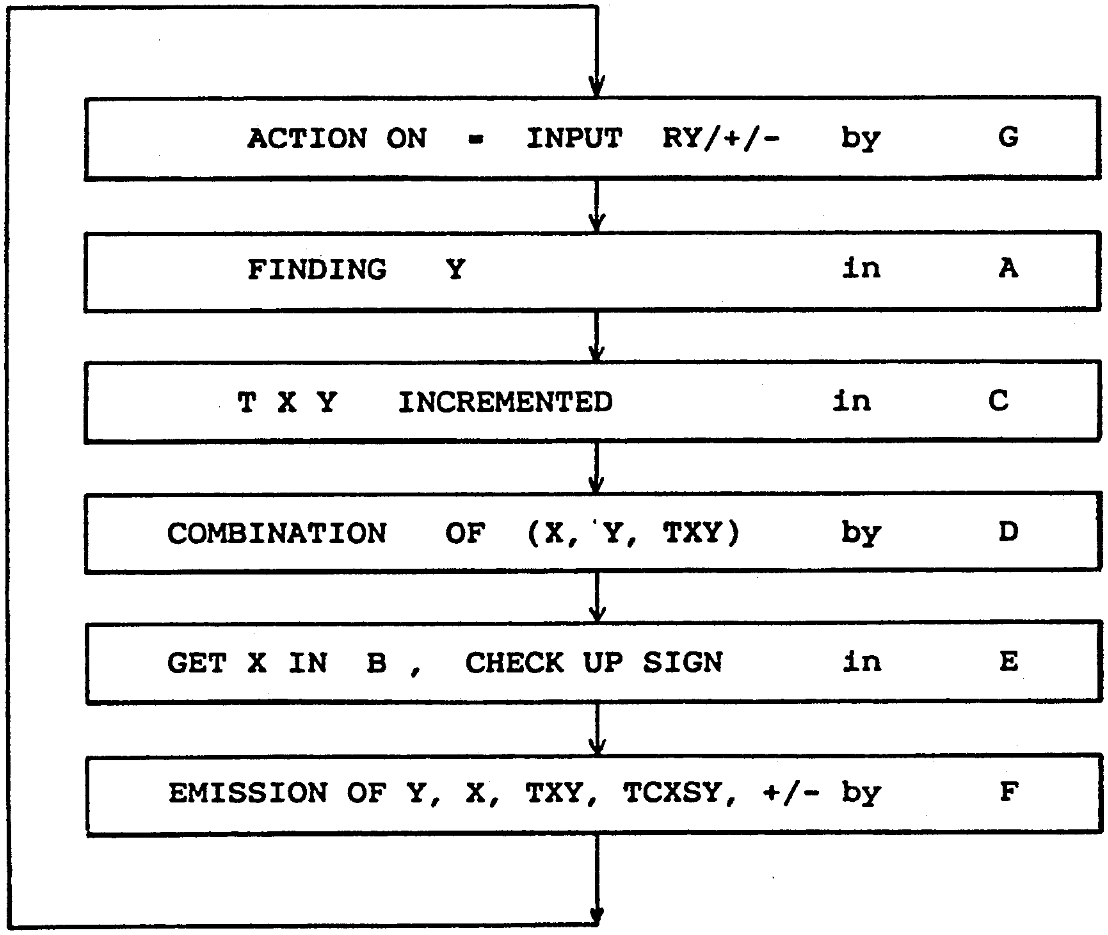
FIG. 3 is a schematic flow chart of the operation of the key of FIG. 1.
Figure 4:
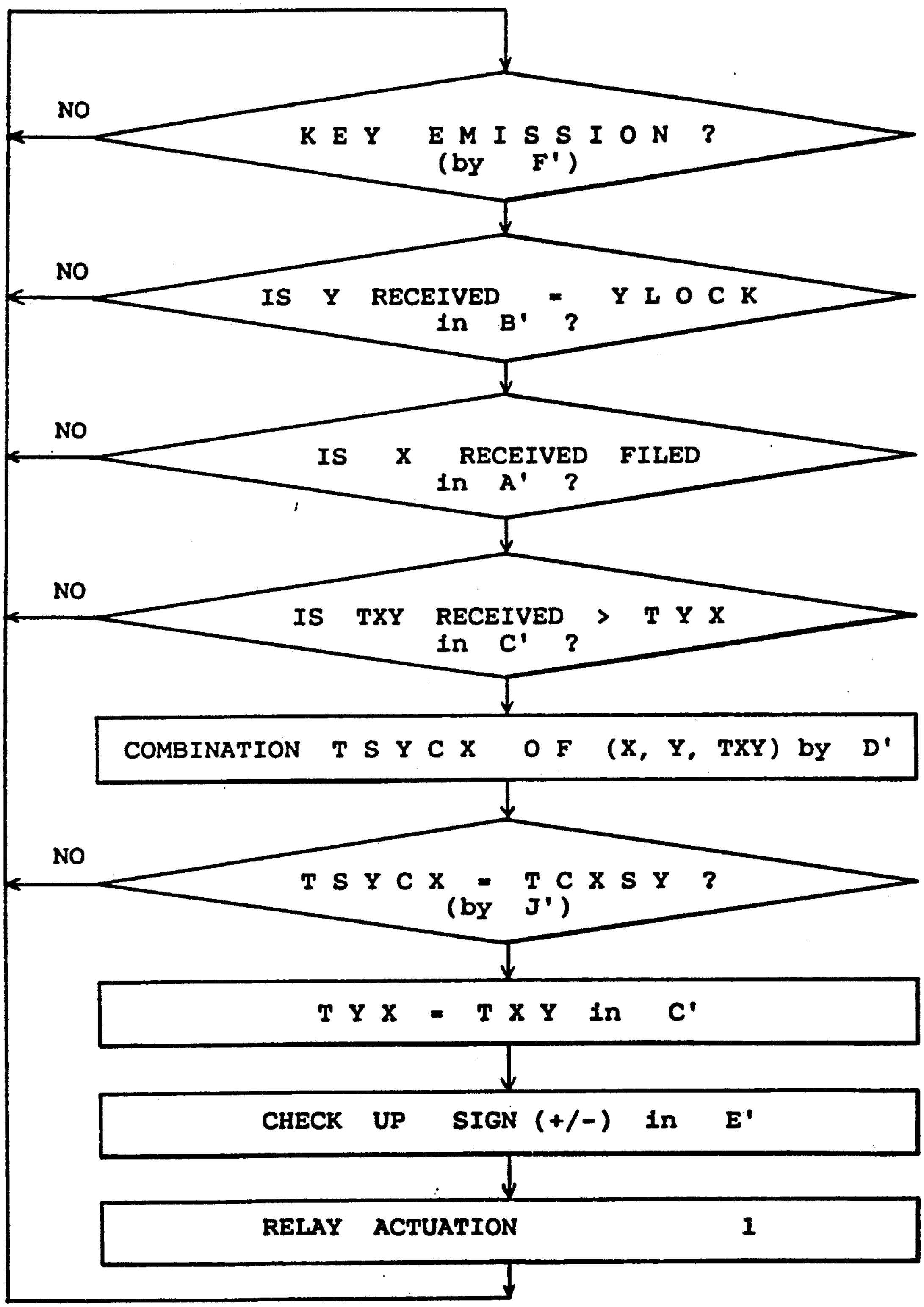
FIG. 4 is a schematic flow chart of the operation of the lock of FIG. 2.

Operating flow charts of the key and lock are given in FIG. 3. and FIG. 4, respectively.

FIG. 3 shows that (X) being unique and (Y) being unique, enciphering by an algorithm (X,Y,TXY) will lead to generation of a number of different codes, even if two different keys have their counter at the same level (TXY) and if they address the same lock (Y) since the numbers of these keys are different. The same will be true if the same key (X) is addressed to two different locks as the numbers of the locks are different and the values representing the counters of the keys are probably different. A same key will certainly emit to the same lock messages that are always different, since its counter (TXY) will vary at the time of each emission. A simple counter of 16 figures creates the possibility for the key to always generate different codes, as the longevity of the key, based on emissions per second, will be limited by the computer only after several hundreds of millions of years.

The operating flow chart of FIG. 4 of the lock shows that synchronization of the messages is automatic. The value (TYX) introduced in (A') is set to the same level as that received from the key. If the value (TXY) received from the counter is at a level less than or equal to that (TYX) already introduced in (A'), the set of data sent by the key is rejected. Just as the key will never emit two identical messages toward a given lock, the lock will never acknowledge two identical messages coming from the same key. The algorithm generating the combination of X,Y,TXY is an irreversible enciphering algorithm, which may be of the type known in the literature, but with a secret key rendering the entire function secret.

Introduction in the key of its number (X) and in the lock of its number (Y) is thus made at the time of manufacture of the key and the lock by software. By way of example, assume a key number 127, (X), and lock number 256, (Y), a key counter (TXY) at the level 163, and a value (TYX) recorded in (A') of the lock (Y) at the level 150. Assume an enciphering algorithm:

$$Fn(X,Y,TXY)=TCSXY=X.Y.TXY.$$

At the time of an actuation, the key will successively emit:

*Sign, Y, X, TXY, TCSXY* or, neglecting the sign (256.127.163.5299456)

Lock number 256 receives this message. It confirms that 256 is indeed its number, that the key 127 is indeed recorded in its memory, and that the value registered in its memory associated with key 127 is at a level less than that emitted by the key (150<163). It thereafter calculates:

$$TSYCX=Fn(X,Y,TXY)=256\times 127\times 163=5299456$$

As TCXSY = TSYCX, the lock executes the given order and increments its counter to the level 163. It will reject thereafter any messages emitted from a counter whose level is less than or equal to 163.

This example shows that nobody may actuate the lock without holding the key, and synchronization will be automatic.

The enciphering algorithms used at present, it will be understood, are much more efficient than a simple multiplication. Their action comprises manipulations of the bits representing each signal. The algorithm is irreversible, inscribed in a non-readable manner in the computers of the key and of the lock and is secret either with a secret key or both. If the numbers representing the lock, the key, and the counter have, respectively, 8, 8 and 16 figures, this will give rise to a combination TCSXY whose length could obtain the equivalent of 32 figures, and a probability of almost zero of emission of two identical messages, no matter how ingenious the person, or the number of keys and locks in use, as well as the number of emissions of these keys.

An alternative of this system is obtained if the lock does not comprise in its memory any lock number but only the numbers of the keys authorized having to be registered in the memory of the lock. In this Figure, the combination emitted by the key is obtained only by using the number of the key and the key counter value.

The successive combinations remain variable and unforeseeable, but with the risk of the actuation of different locks by the same action of the key.

Finally, according to the invention, the key transmits to the lock a message comprising three types of information:

(1) identifications, permitting the lock to verify if the key is authorized and the lock concerned;

(2) data permitting the lock to verify that the key counter has been incremented by comparison with the previous value memorized in the lock; and (3) a code combination, by any secret algorithm, of the two preceding types of information, these latter, received by the lock, permitting this lock to verify that this combination has been generated from data identifying the key and the lock and from data representing an incremented value of the key counter.

The invention therefore assures total security for operation on the basis of a transmitter forming the key and a receiver forming the lock, the lock actuating electromechanical relays for opening and closing, and ensures a permanent synchronization between keys and locks whatever the number of miscarriages, the codes emitted being variable at each emission of the key.

What is claimed is:

1. An electronic wireless remote control system comprising at least one key and at least one lock for actuating relays and the like, wherein (a) said at least one key includes
 (1) a keyboard;
 (2) a first memory containing a correspondence table of references of locks and corresponding numbers of locks to be actuated;
 (3) a second memory containing the number of said key;
 (4) counter means including a memory for storing the value of said counter means;
 (5) a third memory for storing the order for opening and closing said locks;
 (6) computer means using a secret algorithm for generating a combination of the number of said lock to be actuated, the number of said key, and the value of said memory of said counter means; and
 (7) a transmitter for emitting representative signals of the number of the lock to be actuated; the number of said key, the value of said counter means, the combination, and the order of opening and closing;
(b) said at least one lock including
 (1) a keyboard;
 (2) a receiver for receiving signals from said key transmitter;
 (3) a first memory for storing the number of each key authorized to actuate said lock associated with the last value of said key counter means;
 (4) a second memory for storing the number of said lock;
 (5) computer means using said secret algorithm for recognizing the number of said lock, the number of said key transmitting to said lock and the value of said key counter means;
 (6) comparator means for verifying the signals received from said key and the signals representing the number of said lock, the number of said key, and the value of said lock counter means for the considered key, and the value of the combination obtained by said lock computer means; and
(c) a relay actuated by said lock computer means wherein comparator means detects values corresponding with the orders registered and received for opening and closing; and further wherein
(d) said key transmits to said lock to be actuated a message containing
 (1) identification information permitting said lock to verity if said key is authorized and if said lock is responsive to said key;
 (2) data information enabling said lock to verify that said counter means of said key has been incremented by comparison with a previous value stored in said lock; and
 (3) a code comprising a combination of said identification and data information in accordance with a secret algorithm, said code being variable upon each actuation of said key in accordance with variations in said counter means of said key;
(e) and means permitting actuation of said relays to open or close the lock only upon verification that said combination code has been generated from data identifying said key and lock and from data representing an incremental value of said counter means.

2. Electronic remote control system as defined in claim 1 wherein said lock comprises a correspondence table of the numbers of said keys authorized and of said counter means of said keys and verifies that the level of the value of said counter means received from said key is at a level incremented by comparison to the previous value registered in said lock memory for said key, and increments this latter at the level received from said key only if the combination received from said key is identical to the one generated by said lock, thereby eliminating the possibility of the use of a precedent key message by reproduction of a previous one.

3. Electronic remote control system as defined in claim 1, wherein said key comprises memories wherein signals representing the number of said key and the numbers of said locks to be actuated are registered with a signal representing the value of an internal counter incremented in a one-way manner upon each actuation of said key, said signal being sent to said lock with the number of said key and the number of said lock to be actuated.

4. Electronic remote control system as defined in claim 3, wherein said key transmits to said lock, along with the numbers of said key and said lock to be actuated and the value of said key one-way incrementation counter means, an algorithmic combination of said sent values, variable with each action of said key according to the incrementation of said key counter means.

5. Electronic remote control system as defined in claim 4, wherein said lock, after verification that the received numbers of said key and said lock are correct and that the level of the counter value received from said key is at a level incremented by comparison to the previous value registered in said lock memory, generates the combination to be verified only from said data emitted by said key.

6. An electronic wireless remote control system for actuating relays and the like comprising, (a) at least one electronic key for transmitting an authorization message, said key including counter means incremented upon each actuation of said key; and
(b) at least one electronic lock for receiving said message and for actuating relays in response thereto,
(c) said message containing
 (1) identification information permitting said lock to verify if said key is authorized and if said lock is responsive to said key;
 (2) data information enabling said lock to verify that said counter means of said key has been incremented by comparison with a previous value stored in said lock; and
 (3) a code comprising a combination of said identification and data information in accordance with a secret algorithm, said code being variable upon each actuation of said key in accordance with variation in said key counter means;

(d) and means permitting actuation of said relays to open or close the lock only upon verification that said combination code has been generated from data identifying said key and lock and from data representing an incremental value of said counter means.

* * * * *